United States Patent [19]
Kakutani

[11] Patent Number: 5,926,582
[45] Date of Patent: *Jul. 20, 1999

[54] METHOD AND SYSTEM FOR CONVERTING MULTI-GRADATED IMAGE DATA INTO BINARY IMAGE DATA

[75] Inventor: Toshiaki Kakutani, Nagano, Japan

[73] Assignee: Seiko Epson Corporation, Tokyo, Japan

[*] Notice: This patent issued on a continued prosecution application filed under 37 CFR 1.53(d), and is subject to the twenty year patent term provisions of 35 U.S.C. 154(a)(2).

[21] Appl. No.: 08/624,930

[22] Filed: Mar. 29, 1996

[30] Foreign Application Priority Data

Mar. 30, 1995 [JP] Japan .................................. 7-074266

[51] Int. Cl.$^6$ .............................. G06K 9/32; G06K 9/36; G06K 9/38; G06K 9/46
[52] U.S. Cl. .......................... 382/299; 382/252; 358/456
[58] Field of Search .................................... 382/252, 270, 382/276, 237, 299; 358/298, 500, 539, 454, 456, 457

[56] References Cited

U.S. PATENT DOCUMENTS

| 5,581,296 | 12/1996 | Tanimoto et al. ....................... 347/237 |
| 5,592,592 | 1/1997 | Shu ......................................... 382/252 |
| 5,638,188 | 6/1997 | Moro et al. .............................. 358/456 |

FOREIGN PATENT DOCUMENTS

| 0 201 674 | 2/1986 | European Pat. Off. ....... H04N 1/411 |
| 0 389 164 | 3/1990 | European Pat. Off. ....... H04N 1/387 |
| 0481808 | 4/1992 | European Pat. Off. ........ G06F 15/68 |
| 2155761 | 6/1990 | Japan .................................. B41J 2/44 |
| 3231861 | 10/1991 | Japan .................................. B41J 2/21 |

OTHER PUBLICATIONS

R.L. Steveson et al. "Binary display of hexagonally sampled continuous–tone images", Journal of the Optical Society of America, vol. 2, No. 7, Jul. 1995, pp. 1009–1013.

K. T. Knox et al. "Halftoning at low scan rates" Xerox Disclosure Journal, vol. 4, No. 5, Sep. 1979—Oct. 1979, p. 673.

*Primary Examiner*—Bipin H. Shalwala
*Attorney, Agent, or Firm*—Sughrue, Mion, Zinn, Macpeak & Seas, PLLC

[57] ABSTRACT

An image processing system and method for varying the resolution of multi-gradated image data to output image data having a different resolution. In the system and method, the resolution of the multi-gradated image data is converted to prepare image data having alternating dots arranged in lines and rows such that those of said dots present in odd-numbered lines and those of said dots present in even-numbered lines are positioned in alternate rows. The image data having alternating dots is transformed into binarization data. The binarization data is converted into binary gradated image data by using an error diffusion method or an average error minimization method. The dot arrangement of the binary gradated image data is then transformed into a dot arrangement equal to that of the image data having alternating dots. The system and method thus obtains a high quality reproduced image at a speed as high as possible.

12 Claims, 10 Drawing Sheets

(ODD-NUMBERED LINE)

|  | (j-2) | (j-1) | (j) | (j+1) |  |
|---|---|---|---|---|---|
| (i) |  |  | * | 1 | (k) ODD |
| (i+1) | 1 | 2 | 2 | 1 | (g) EVEN |
| (i+2) |  |  | 1 |  | (k) ODD |
|  |  |  |  |  | (g) EVEN |

* : TARGET PIXEL

FIG. 5

(EVEN-NUMBERED LINE)

|  | (j-1) | (j) | (j+1) | (j+2) |  |
|---|---|---|---|---|---|
| (i) |  | * | 1 |  | (g) EVEN |
| (i+1) | 1 | 2 | 2 | 1 | (k) ODD |
| (i+2) |  | 1 |  |  | (g) EVEN |
|  |  |  |  |  | (k) ODD |

* : TARGET PIXEL

FIG. 6

* : TARGET PIXEL

(ODD-NUMBERED LINE)

|  | (j-2) | (j-1) | (j) | (j+1) |  |
|---|---|---|---|---|---|
| (i) |  |  | * | 2 | 1 | (k) ODD |
| (i+1) | 1 | 4 | 4 | 1 |  | (g) EVEN |
| (i+2) |  | 1 | 1 | 1 |  | (k) ODD |
|  |  |  |  |  |  | (g) EVEN |

* : TARGET PIXEL

FIG. 14

(EVEN-NUMBERED LINE)

|  | (j-1) | (j) | (j+1) | (j+2) |  |
|---|---|---|---|---|---|
| (i) |  | * | 2 | 1 |  | (g) EVEN |
| (i+1) | 1 | 4 | 4 | 1 |  | (k) ODD |
| (i+2) | 1 | 1 | 1 |  |  | (g) EVEN |
|  |  |  |  |  |  | (k) ODD |

* : TARGET PIXEL

FIG. 15

|  | * | 2 | 1 |  |
|---|---|---|---|---|
| 1 | 4 | 4 | 1 |  |
|  | 1 | 1 | 1 |  |

* : TARGET PIXEL

METHOD AND SYSTEM FOR CONVERTING MULTI-GRADATED IMAGE DATA INTO BINARY IMAGE DATA

BACKGROUND OF THE INVENTION

1. Field of the Invention

The present invention relates to an image processing method and system for converting multi-gradated image data into binary image data having a resolution different from that of the multi-graded image data.

2. Description of the Related Art

A typical image forming system is capable of converting original image data, which is read by a scanner or the like, into data which is compatible with an image output unit such as a printer. Some of the conventional image forming systems are also designed to output original image data after changing its resolution.

Published Japanese patent application no. 155761/1990, for example, describes an image processing method for outputting original image data after changing its resolution from 300 dpi to 600 dpi. Also, published Japanese patent application no. 231861/1991 describes a printing method under which a second dot pattern is complementarily struck against a first dot pattern to create a printed image having higher resolution.

Both of these conventional methods are intended to reproduce the original image with precision by increasing the resolution of the image data. However, the higher the set resolution, the longer the image processing time becomes, thus making high-speed printing impossible.

When using a printer incapable of regeneratively displaying multi-gradation image data, that is, a printer which is incapable of controlling the gradation of each dot or pixel of the image, a binarization process is employed to change the gradation of each pixel of a multi-gradated original image to a binary gradation. Although there are various methods of binarizing multi-gradated image data, an error diffusion method and an average error minimization method typically provide excellent image quality.

As is well known in the art, the error diffusion method is used to add a quantitative error, which arises when a pixel is binarized, to peripheral pixels that have not yet been subjected to binarization, by diffusion. On the other hand, the average error minimization method, which is also well known, corrects the data value of a selected pixel with the weighted mean values of the quantitative errors attributed to binarized pixels surrounding the selected pixel.

The error diffusion method and the average error minimization method are different only because of different timing at which the error diffusing operation is performed and hence, are theoretically equivalent. Published Japanese Patent application no. 284173\1989, for example, describes one of the specific examples of the binarization process using the error diffusion method.

SUMMARY OF THE INVENTION

An object of the present invention to obtain a reproduced image of quality as good as possible at a speed as high as possible when multi-gradated image data is reproduced by a printer or any other image output unit which is incapable of printing or displaying multi-gradated image data. To achieve this object, the present invention provides a system and method for obtaining a reproduced image of excellent quality at high speed by performing a resolution conversion process in which multi-gradated image data dots are disposed alternately on odd and even-numbered lines, and further, by subjecting the converted data to a binarization process, in particular, the binarization process based on an error method such as an error diffusion method.

Specifically, an image processing method according to the present invention comprises the steps of (1) converting the resolution of the multi-gradated image data to create image data having alternating dots in which dots on odd-numbered lines and dots on even-numbered are alternately positioned; (2) transforming the image data having alternating dots into binarization data on which a binarization process based on an error method can be performed; (3) effecting binarization based on the error method by converting the binarization data into binary gradated image data using an error diffusion method and an average error minimization method; and (4) transforming the dot arrangement of the binary gradated image data, thus obtained, to an arrangement equal to that of the image data having alternating dots.

To perform the above method, an image processing system according to the present invention comprises (1) a resolution conversion unit for converting the resolution of the multi-gradated image data to create image data having alternating dots so that dots on odd-numbered lines and dots on even-numbered are alternately positioned; (2) a binarization data preparing unit for transforming the image data having alternating dots into binarization data on which a binarization process based on an error method can be performed; (3) a binarization unit for converting the binarization data into binary gradated image data using an error diffusion method and an average error minimization method; and (4) an image data reconstitution unit for transforming the dot arrangement of the binary gradated image data thus obtained into a dot arrangement equal to that of the image data having alternating dots.

The resolution conversion unit varies the resolution in the following two manners: Firstly, the multi-gradated image data having predetermined low resolution is converted to image data having a higher resolution. Secondly, the multi-gradated image data having a predetermined high resolution is converted to image data having a resolution lower than the high resolution.

Figure 8:
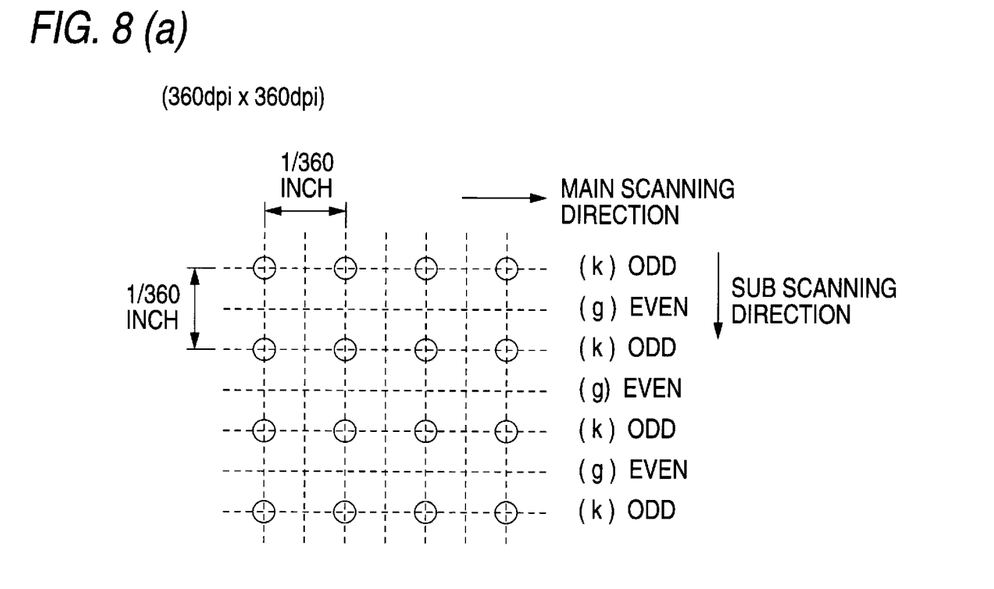
FIG. 8(a) illustrates a dot arrangement of low-resolution original image data.
FIG. 8(b) illustrates a dot arrangement of intermediate-resolution image data obtained by varying the dot arrangement shown in FIG. 8(a)

As shown in FIGS. 8(a) and 8(b), for example, image data having a low resolution of 360 dpi×360 dpi is converted to image data having a higher resolution of 720/√2 dpi×720/√2 dpi. Alternatively, as shown in FIGS. 9(a)–9(c), image data having a high resolution of 720 dpi×720 dpi is converted to image data having a lower resolution of 720/√2 dpi×720/√2 dpi.

Figure 9:
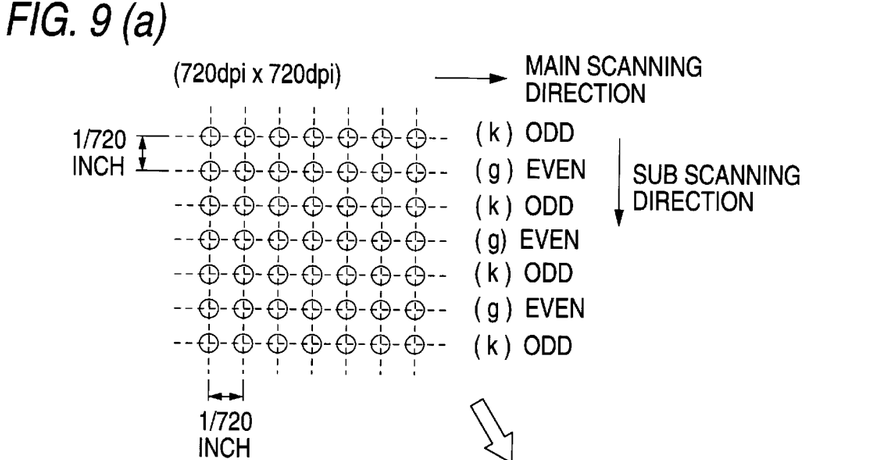
FIG. 9(a) illustrates a dot arrangement of high-resolution original image data.
FIG. 9(b) illustrates the marking of those dots in the arrangement shown in FIG. 9(a) which have a high density value.
FIG. 9(c) illustrates a dot arrangement of intermediate-resolution, image data obtained by varying the dot arrangement shown in FIG. 9(a) in accordance with the marking as shown in FIG. 9(b)

Since the dots on the odd and even-numbered lines of the image data subjected to the resolution conversion are alternately shifted as shown in FIG. 8(b) or FIG. 9(c), the binarization process based on the error diffusion method can easily be performed on these dots. To accomplish this, a memory can be used having a capacity corresponding to high resolution, that is, 720 dpi, and the gradation value of a pixel without any dot is set to zero, so that the binarization process based on the error diffusion or the like is effected. However, such a binarization process may require a large memory capacity and therefore become costly, thus resulting in an extremely long processing time.

To decrease the processing time while also reducing cost of the system, the present invention provides the binarization data preparing unit to prepare data, on which the binarization process can be performed, based the error diffusion method or the like. More specifically, the image data with alternating dots is transformed by the binarization data preparing unit to binarization data so as to shift either dot on the odd-numbered line of the image data with alternating dots or dot on the even-numbered line in the main scanning direction.

Figure 10:
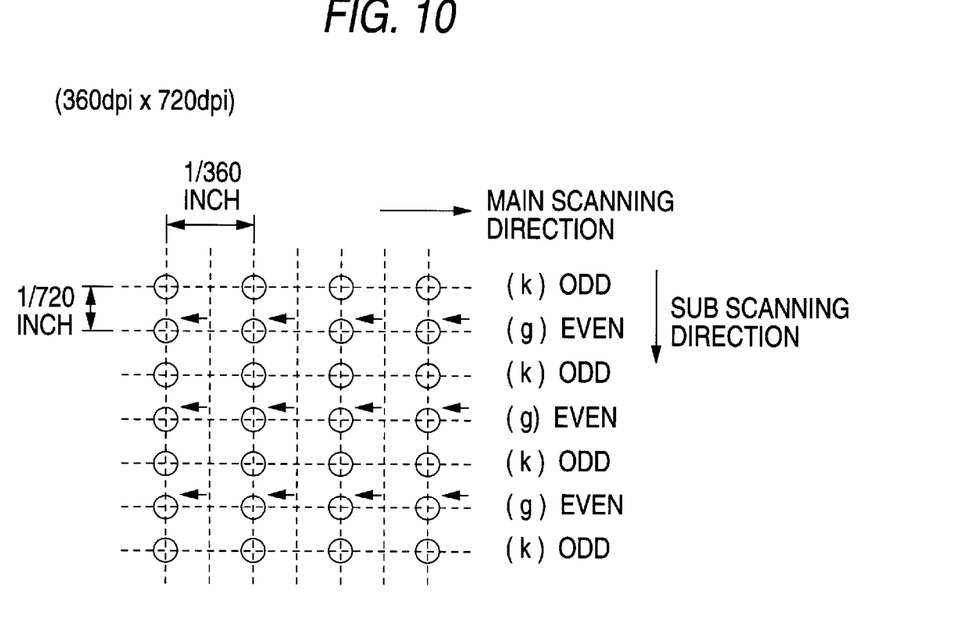
FIG. 10 illustrates image data, obtained by varying the intermediate-resolution dot arrangement, on which binarization processing based on the error diffusion method is to be performed.

With respect the image data with alternating dots shown in FIG. 8(b) or FIG. 9(c), for example, the binarization data of 360 dpi×720 dpi shown in FIG. 10 is obtained by shifting each dot on the even-numbered line (g) by 1/720 inch leftward in the main scanning direction. When the binarization data is subjected to the binarization process, only a memory capable of handling one line equivalent to 360 dpi in the main scanning direction is needed. Hence, the memory capacity for the binarization process is reduced. Moreover, the processing speed is raised.

The error attributed to the selected pixel is weighted before being diffused, and the average error is obtained via the binarization processing method using the error diffusion method and average error minimization method. Therefore, a weighted matrix must be set beforehand to enable these two kinds of binarization processes to be performed. It is preferable to switch the weighted matrix from that which is used for the even-numbered line (g), which is shifted, to that which is used for the odd-numbered line (k), which is not shifted, and vice versa, when the binarization process is performed on the basis of the image data prepared by shifting either even-numbered line (g) or odd-numbered line (k) in the main scanning direction as shown in FIG. 10.

In summary, in the image processing method and the image processing system of the present invention, the low resolution of the image data is converted to the high resolution so that the dots on the odd-numbered lines and those on the even-numbered lines are alternately disposed. The image data is binarized by the error diffusion method and the like, so that the low-resolution image data becomes reproducible as image data having excellent image quality and higher resolution. Since the high resolution of the image data is converted to lower resolution image data, moreover, the image is made reproducible at high speed with, for example, less ink consumption during printing. Further, the high resolution of the image data is converted to the lower resolution so that the dots on the odd-numbered lines and those on the even-numbered lines are alternately disposed, and the image data is binarized by the error diffusion method and the like, so that the high image quality is not deteriorated.

In short, the image processing method and system according to the present invention makes it possible to reproduce an image having excellent quality from low-resolution image data, while also allowing high-resolution image data to be reproducible at higher speed. Further, the binarization data preparing unit according to the present invention allows the image data subjected to resolution conversion to be binarized without difficulty by using the error diffusion method and the like.

BRIEF DESCRIPTION OF THE DRAWINGS

These and other objects and advantages of the invention will become more apparent and more readily appreciated from the following detailed description of the presently preferred exemplary embodiments of the invention taken in conjunction with the accompanying drawings, of which.

DETAILED DESCRIPTION OF THE PREFERRED EMBODIMENTS

Figure 1:
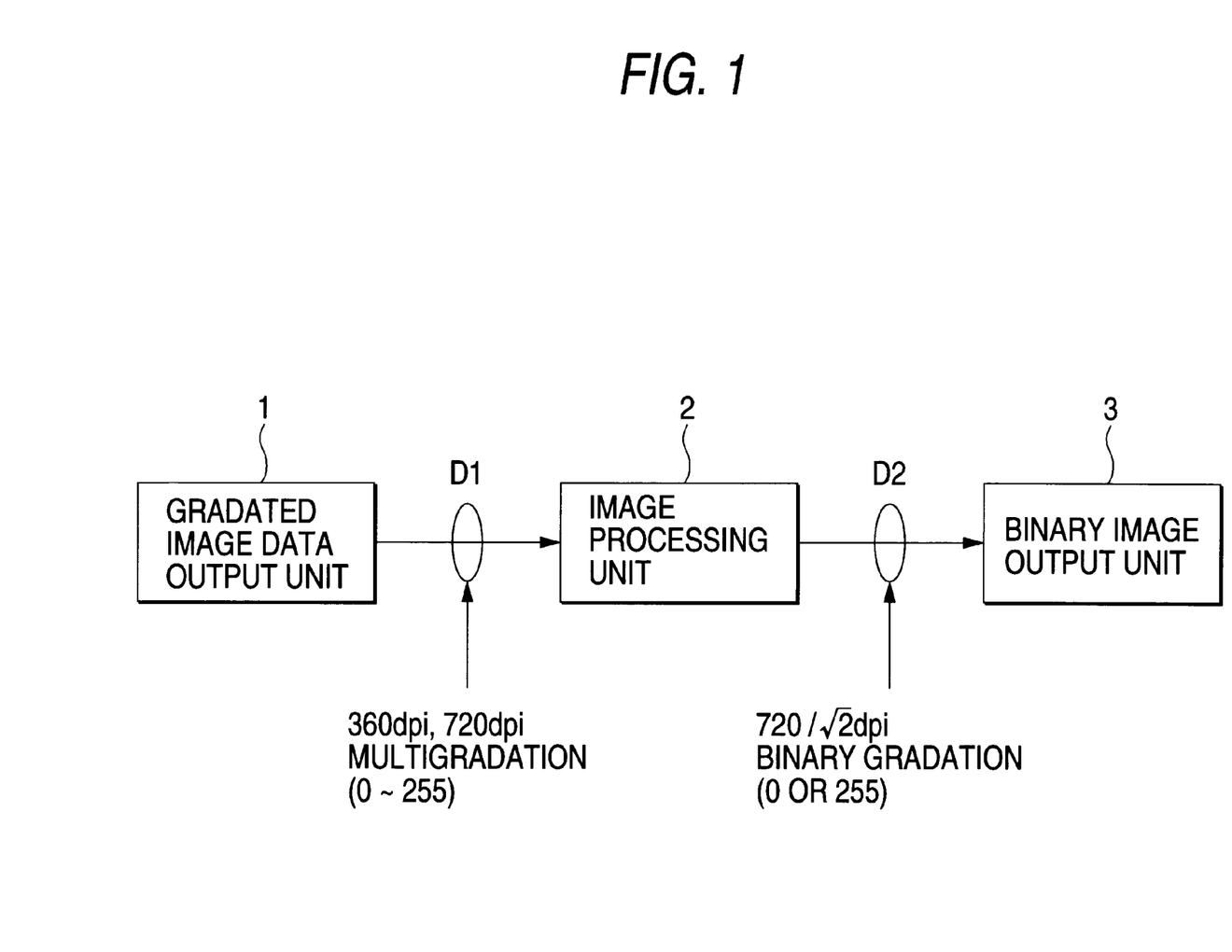
FIG. 1 is a block diagram of an image forming system using an image processing system according to an embodiment of the present invention.

FIG. 1 is a block diagram showing an image forming system using an image processing system according to a first embodiment of the present invention. This image forming system comprises a gradated image data output unit 1, an image processing unit 2, and a binary image output unit 3. The gradated image data output unit 1 includes, for example, a host computer, a scanner, a video camera or the like, and outputs multi-gradated original image data D1 having a predetermined low or high resolution.

According to this embodiment of the invention, 360 dpi×360 dpi is set as the predetermined low resolution, and 720 dpi×720 dpi is set as the predetermined high resolution. Moreover, 8 bits, that is, 256 gradations ranging from 0 to 255 are the gradation values of the multi-gradated original image data D1. Of course, any practical values for the high and low resolution, as well as the number gradation values, can be used.

The image processing unit 2 converts the received resolution of the multi-gradated original image data D1 into a predetermined intermediate resolution, and converts the gradations into binary gradation which is compatible with the binary image output unit 3, so as to output binary-gradated, intermediate-resolution image data D2. In particular, multi-gradated, low or high-resolution image data D1 is corrected by using an error diffusion method or an average error minimization method, and the corrected image data D1 is converted into the binary gradated image data D2 having only first and second (binary) gradation values. According to this embodiment of the invention, $720/\sqrt{2}$ dpi is considered an intermediate resolution, 0 (white) is the first gradation value, and 255 (black) is the second gradation value.

The binary image output unit 3 outputs the original image reproduced on the basis of the binary gradated, intermediate-resolution image data D2 that is output from the image processing unit 2. The binary image output unit 3 is, for example, a printer which is unable to control gradation with a pixel or dot as a unit, and reproduces and outputs the original image in such a manner as to make medium contrast display possible on the basis of the received binary gradated image data D2. Incidentally, instead of a printer, a display, a facsimile, a digital copying machine or the like may be used as the binary image output unit 3, as desired.

Figure 2:
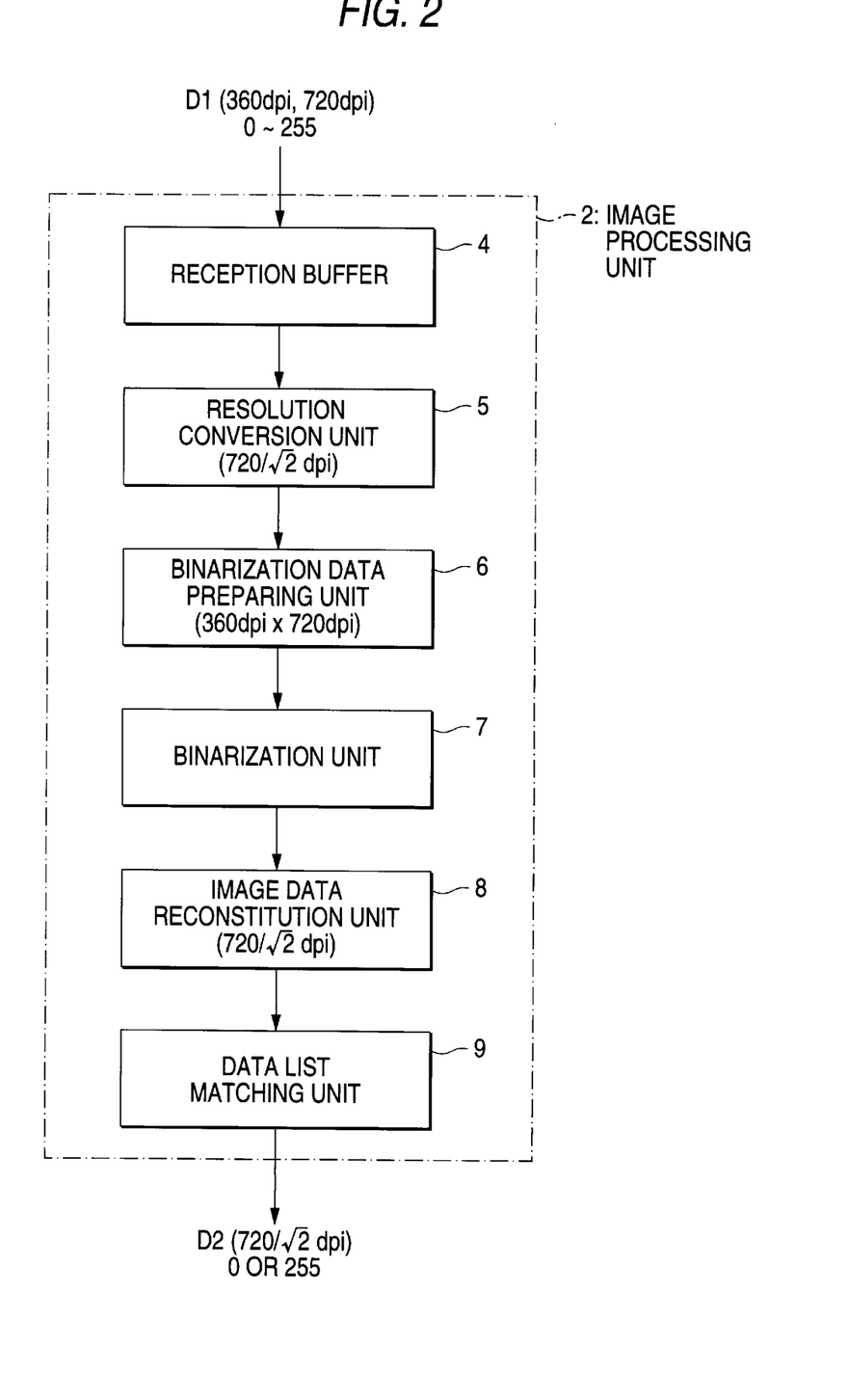
FIG. 2 is a block diagram of an embodiment of the image processing system of the present invention employed in the system shown in FIG. 1.

As shown in FIG. 2, the image processing unit 2 comprises a reception buffer 4, a resolution conversion unit 5, a binarization data preparing unit 6, a binarization unit 7 which performs binarization based on the error diffusion method, an image data reconstitution unit 8, and a data list matching unit 9. The resolution conversion unit 5 converts image data at low resolution (360 dpi) and high resolution (720 dpi) to data at intermediate resolution ($720/\sqrt{2}$ dpi). The binarization data preparing unit 6 converts the image data at the intermediate resolution into a dot arrangement compatible for use in the binarization process using the error diffusion method, as performed by the binarization unit 7. Moreover, the image data reconstitution unit 8 transforms the bit image data, subjected to the binarization process in binarization unit 7, back into image data having the intermediate resolution ($710/\sqrt{2}$ dpi).

Figure 3:
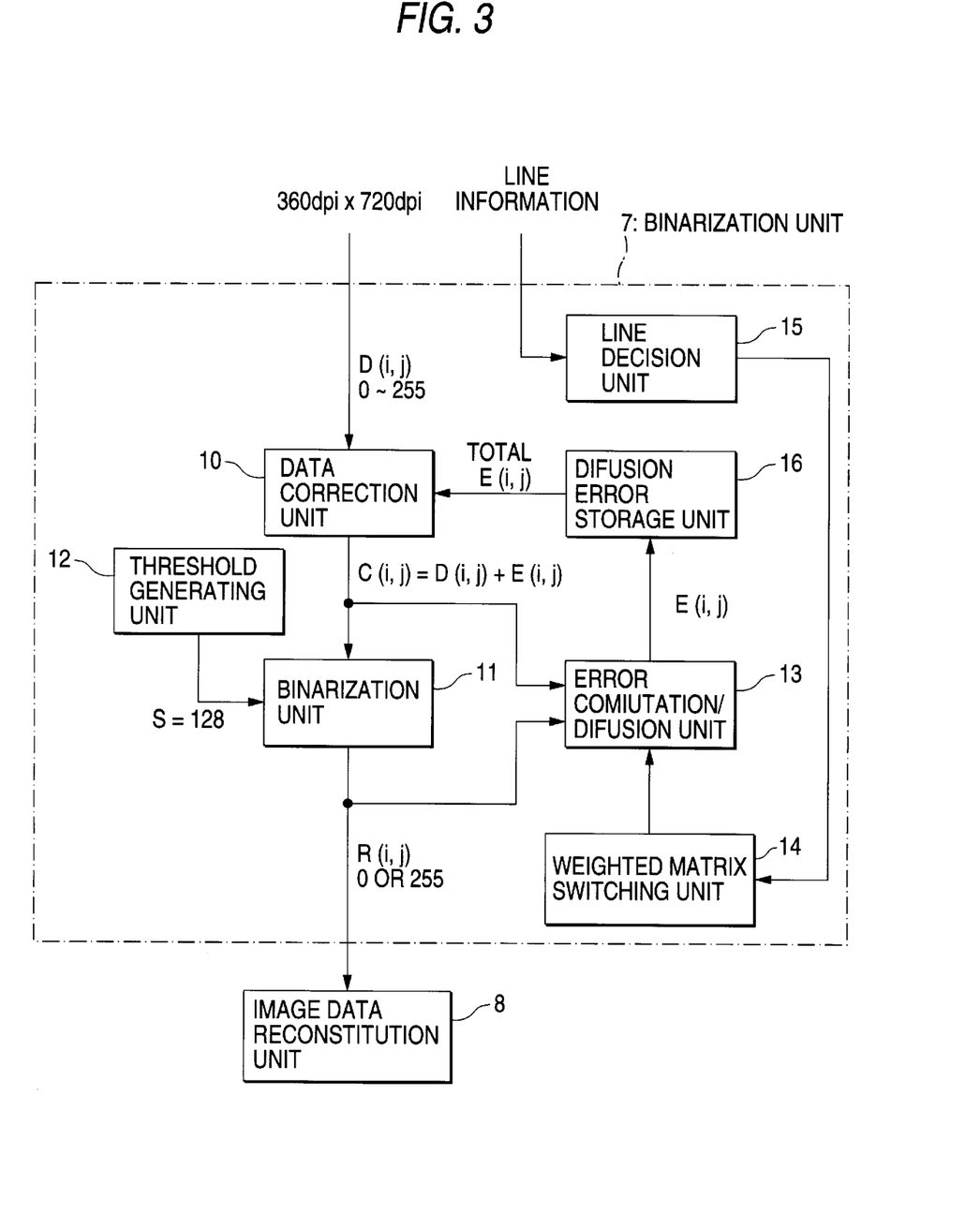
FIG. 3 is a block diagram illustrating an embodiment of a binarization processing unit of the image processing system shown in FIG. 2 which performs binarization based on an error diffusion method.

As shown in FIG. 3, the binarization unit 7, which performs binarization based on the error diffusion method, comprises a data correction unit 10 for adding input data D(i, j) and error data total E(i, j) of 256 gradations concerning a selected pixel P(i, j) present in line i, row j of the image data to produce added data C(i, j), a binarization unit 11 for comparing the added data C(i, j) with a predetermined threshold value S that is output from a threshold generating unit 12, so as to output binary data R(i, j) having a graduation of 0 or 255, and an error computation/diffusion unit 13 for calculating errors in the added data C(i, j) and the output binary data R(i, j) and simultaneously diffusing the errors among peripheral pixels. The binarization unit 7 further comprises a weighted matrix switching unit 14 for designating a weighted matrix as a weighting standard at the time of diffusion/computation by the error computation/diffusion unit 13, a line decision unit 15 for deciding whether the selected pixel P(i, j) belongs to an odd-numbered line or an even-numbered line, and a diffusion error storage unit 16 for storing error components on a pixel basis concerning the respective peripheral pixels calculated in the error computation/diffusion unit 13.

Figure 4:
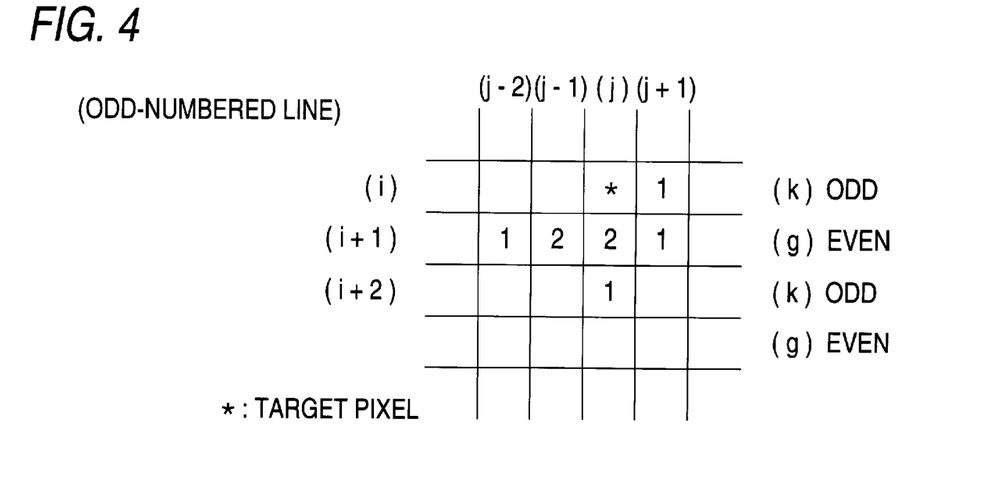
FIG. 4 illustrates an example of a weighted matrix to be switched over when a binarization process based on the error diffusion method is performed by the binarization processing unit shown in FIG. 3.
Figure 5:
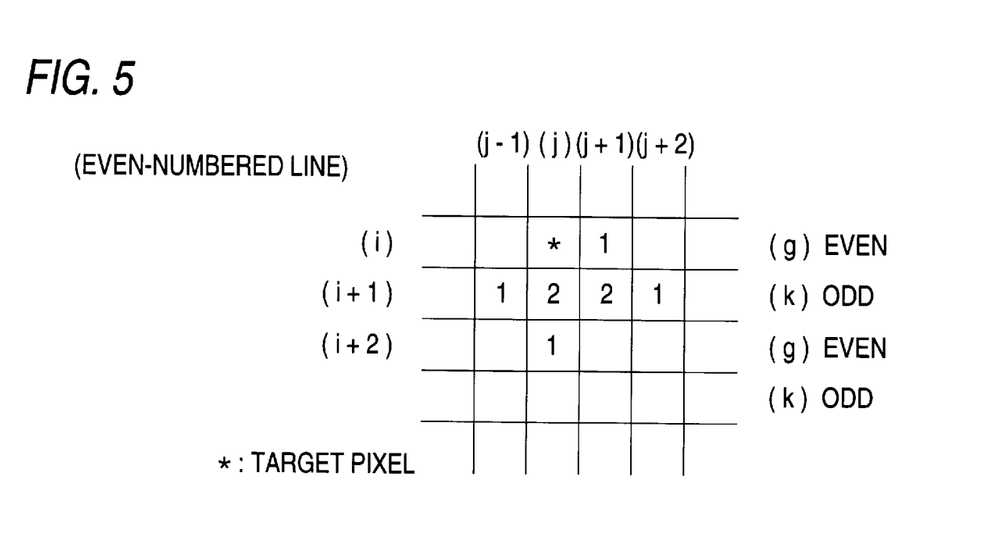
FIG. 5 illustrates another example of a weighted matrix to be switched over when the binarization process based on the error diffusion method is performed by the binarization processing unit shown in FIG. 3.

The weighted matrix switching unit 14 stores two kinds of weighted matrices, so that one of the weighted matrices is designated according to whether the selected pixel P(i, j) belongs to the odd-numbered or even-numbered line. For example, a matrix for the odd-numbered line is shown in FIG. 4, and a matrix for the even-numbered line is shown in FIG. 5.

Figure 7:
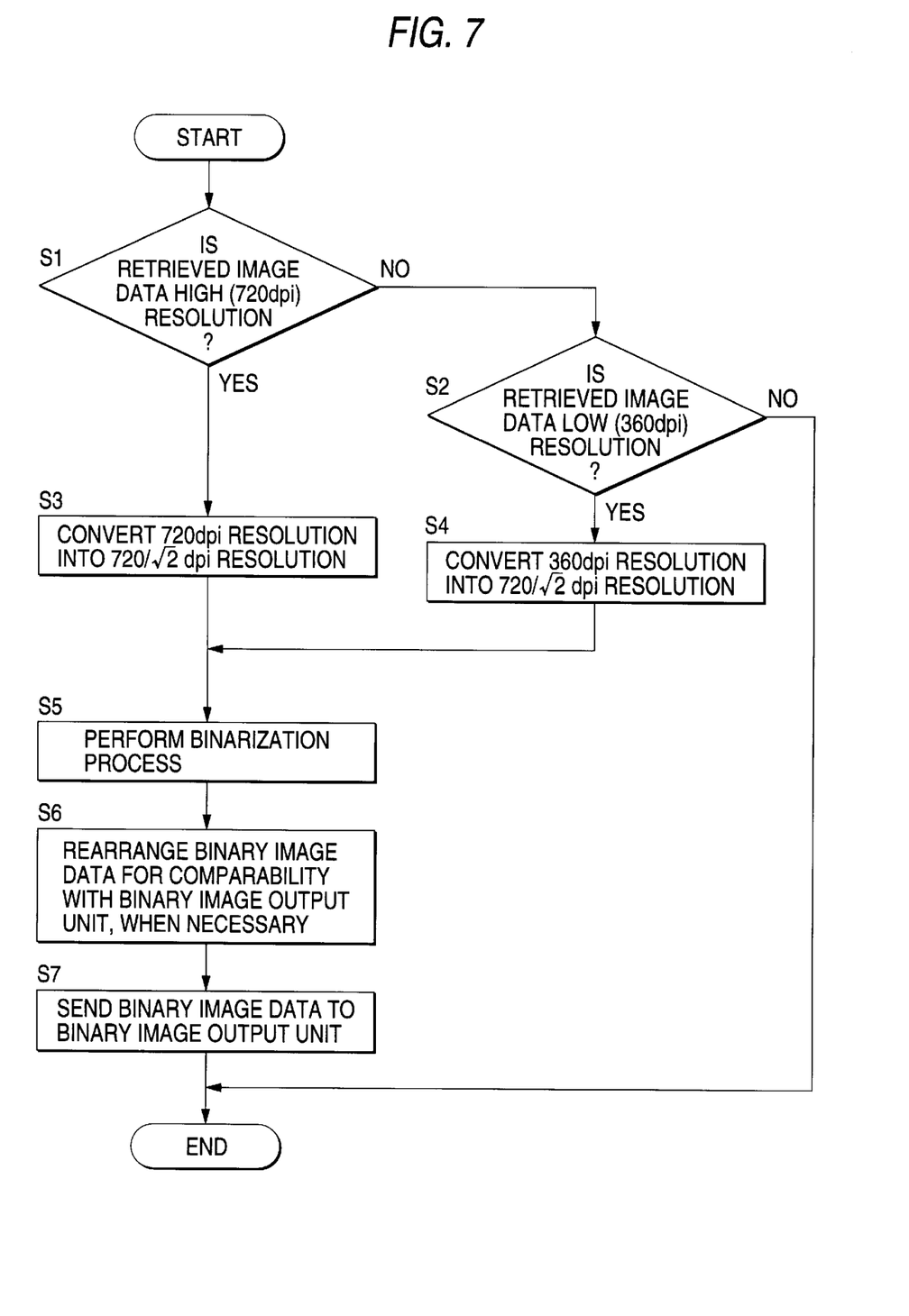
FIG. 7 is a flowchart showing an image processing method performed by the embodiment of the present invention as shown, for example, in FIG. 2.

The flowchart shown in FIG. 7 illustrates the operation of the image forming system of the embodiment of the invention described in the above-referenced figures.

In the embodiment shown in FIG. 1, the low-resolution image data of 360 dpi×360 dpi or the high-resolution image data of 720 dpi×720 dpi is output from the gradated image data output unit 1 as the multi-gradated original image data D1 before being received by the image processing unit 2. As shown in FIG. 8(a), the low-resolution image data of $\frac{1}{360}$ dpi has dots (identified with a ○ mark) disposed at intervals of $\frac{1}{360}$ inch in the main scanning and sub-scanning directions, whereas the high-resolution image data of 720 dpi, as shown in FIG. 9(a), has dots (also identified with a ○ mark) arranged at intervals of $\frac{1}{720}$ inch in the main scanning and sub-scanning directions. Further, each dot has any one of 256 gradation values ranging from 0 to 255.

The image processing unit 2 stores the retrieved image data D1 in the reception buffer 4, and then the resolution of the image data is changed in the resolution conversion unit 5. Specifically, in steps S1 and S2 shown in FIG. 7, a decision is made as to whether the retrieved data is of 720 dpi (high resolution) or 360 dpi (low resolution), and each of the resolutions is subjected to a resolution conversion process.

When image data having 720 dpi has been retrieved, two adjoining dots are considered as one set, and the dot which has a higher density value (as identified with a ● mark) within the set is selected as shown in FIG. 9(b). Then, in step S3 of FIG. 7, the selected dot is shifted by $\frac{1}{720}$ inch in the main scanning direction, if necessary, to prepare image data having an intermediate resolution of $720/\sqrt{2}$ dpi, as shown in FIG. 9(c). With the selection of the dot having the higher density value within one set, thin lines are prevented from being obliterated even when the original image is drawn with thin lines on a white background.

On the other hand, when image data having 360 dpi has been retrieved, in step S4 of FIG. 7, the gradation value of each dot is copied at a dot position $\sqrt{2}/720$ inch apart therefrom so as to prepare image data having an intermediate resolution of $720/\sqrt{2}$ dpi, as shown in FIG. 8(b). Accordingly, the original image data is converted to image data having an intermediate resolution of $720/\sqrt{2}$ dpi when the original image has either 720 dpi or 360 dpi.

The image data after resolution conversion is subsequently sent to the binarization data preparing unit 6. As shown in FIG. 10, the binarization data preparing unit 6 shifts each dot on an even-numbered line (g), with $720/\sqrt{2}$ dpi×$720/\sqrt{2}$ dpi resolution, by $\frac{1}{720}$ inch leftward in the main scanning direction, to prepare image data for binarization processing with 360 dpi×720 dpi based on the error diffusion method. In step S5 of FIG. 7, the binarization process is performed by the binarization unit 7 shown in FIG. 2 based on the error diffusion method. In other words, the multi-gradated image data D(i, j) concerning the selected pixel P(i, j) present in line i, row j is input to the data correction unit 10 of the binarization unit 7 which performs binarization with the error diffusion method. The data correction unit 10 corrects the multi-gradated image data D(i, j) with the error data total E(i, j) that is output from the diffusion error storage unit 16.

Specifically, by adding the error data total−E(i, j), the corrected data C(i, j) is $$C(i, j)=D(i, J)+total-E(i, j).$$

Accordingly, the diffused error data total−E(i, j) stored in the diffusion error storage unit 16 is the sum total of the error diffused into the selected pixel P(i, j) during the binarization of pixels P(i−1, j) and P(i, j−1) which are close to selected pixel P(i, j) and have been binarized.

As described above, the binarization unit 11 compares the corrected data C(i, j) concerning the input watched pixel P(i, j) with a threshold value S, for example, S=128, and outputs the result R(i, j) of binarization as binary gradated image data depending on the result of comparison. Specifically, the binarization unit 11 outputs:

$$R(i, j)=255, \text{ when } C(i, j) \geq S$$

$$R(i, j)=0, \text{ when } C(i, j) < S$$

The binary gradated image data is sent to not only the image data reconstitution unit 8, but also to the error computation/diffusion unit 13.

The error computation/diffusion unit 13 obtains a binarized error E(i, j) from the result of binarization R(i, j) and the corrected image data C(i, j), such that $$E(i, j)=C(i, j)-R(i, j).$$

Then, this binarized error E(i, j) is distributed, that is, diffused, into neighboring unbinarized pixels P(i, j+1), P(i+1, j), P(i+1, j+1), and so on, in accordance with the weighted value of the weighted matrix designated by the weighted matrix switching unit 14. In particular, the diffused error from the selected pixel P(i, j) is added to diffused error integrated values tatal−E(i, j+1), tatal−E(i+1, j) and the like, on a pixel basis. However, the initial values of the diffused error integrated values prior to the commencement of the binarization process now need to be set to zero.

The line decision unit 15 decides whether the data belongs to the odd-numbered or even-numbered line when the image data D(i, j) is retrieved, and feeds the result of decision into the weighted matrix switching unit 14. When the selected pixel P(i, j) belongs to the odd-numbered line, the weighted matrix switching unit 14 applies the weighted matrix shown in FIG. 4 to the error computation/diffusion unit 13. Alternatively, when the selected pixel P(i, j) belongs to the even-numbered line, the weighted matrix switching unit 14 applies the weighted matrix shown in FIG. 5 to the error computation/diffusion unit 13.

When the selected pixel P(i, j) belongs to the odd-numbered line, error diffusion is performed in accordance with the matrix of FIG. 4 as follows:

$$total-E(i, j+1)=tatal-E(i, j+1)+E(i, j)\times(1/8)$$

$$total-E(i+1, j-2)=total-E(i+1, j-2)+E(i, j)\times(1/8)$$

$$total-E(i+1, j-1)=total-E(i+1, j-1)+E(i, j)\times(2/8)$$

$$total-E(i+1, j)=total-E(i+1, j)+E(i, j)\times(2/8)$$

$$total-E(i+1, j+1)=total-E(i+1, j+1)+E(i, j)\times(1/8)$$

$$total-E(i+2, j)=total-E(i+2, j)+E(i, j)\times(1/8).$$

When the selected pixel P(i, j) belongs to the even-numbered line, however, error diffusion is performed in accordance with the matrix of FIG. 5 as follows:

$$total-E(i, j+1)=total-E(i, j+1)+E(i, j)\times(1/8)$$

$$total-E(i+1, j-1)=total-E(i+1, j-1)+E(i, j)\times(1/8)$$

$$total-E(i+1, j)=total-E(i+1, j)+E(i, j)\times(2/8)$$

$$total-E(i+1, j+1)=total-E(i+1, j+1)+E(i, j)\times(2/8)$$

$$total-E(i+1, j+2)=total-E(i+1, j+2)+E(i, j)\times(1/8)$$

$$total-E(i+2, j)=total-E(i+2, j)+E(i, j)\times(1/8).$$

The binarization and error diffusion of the selected pixel P(i, j) are then terminated. Subsequently, an adjoining pixel on the right in the image data of 360 dpi×720 dpi, as shown in FIG. 10, becomes the selected pixel, and the binarization and error diffusion processes are likewise repeated. When the binarization equivalent to one line of image data is completed through the repetition of the above steps, the value of "j" is set back to zero, and the leftmost pixel on the next line becomes the selected pixel by incrementing "i" by one so that the binarization process can be repeated. The binarization of image data of FIG. 10 covering one picture is carried out through the repetition of the binarization process.

The binarization process is thus conducted under the error diffusion method. Since memory capacity equivalent to only one line of 360 dpi, that is, one line in the main scanning direction of FIG. 10, is sufficient to perform binarization processing, not only the memory capacity, but also processing time, is reduced in comparison with a case where a memory equivalent to 720 dpi is needed.

Figure 6:
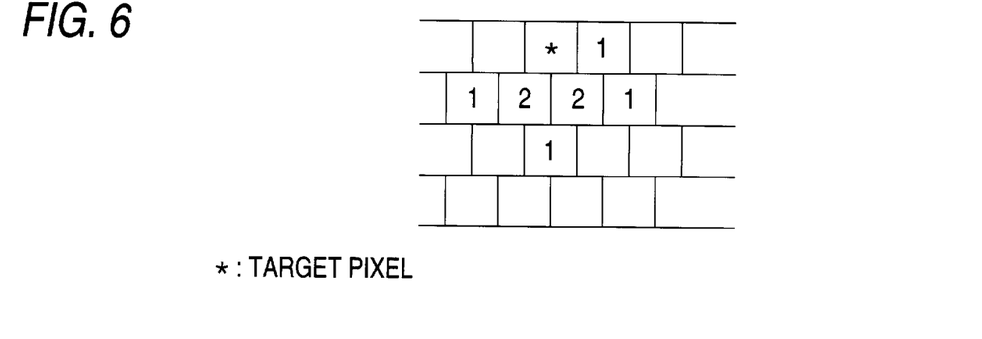
FIG. 6 illustrates a further example of a weighted matrix to be switched over when the binarization process based on the error diffusion method is performed by the binarization processing unit shown in FIG. 3.
Figure 11:
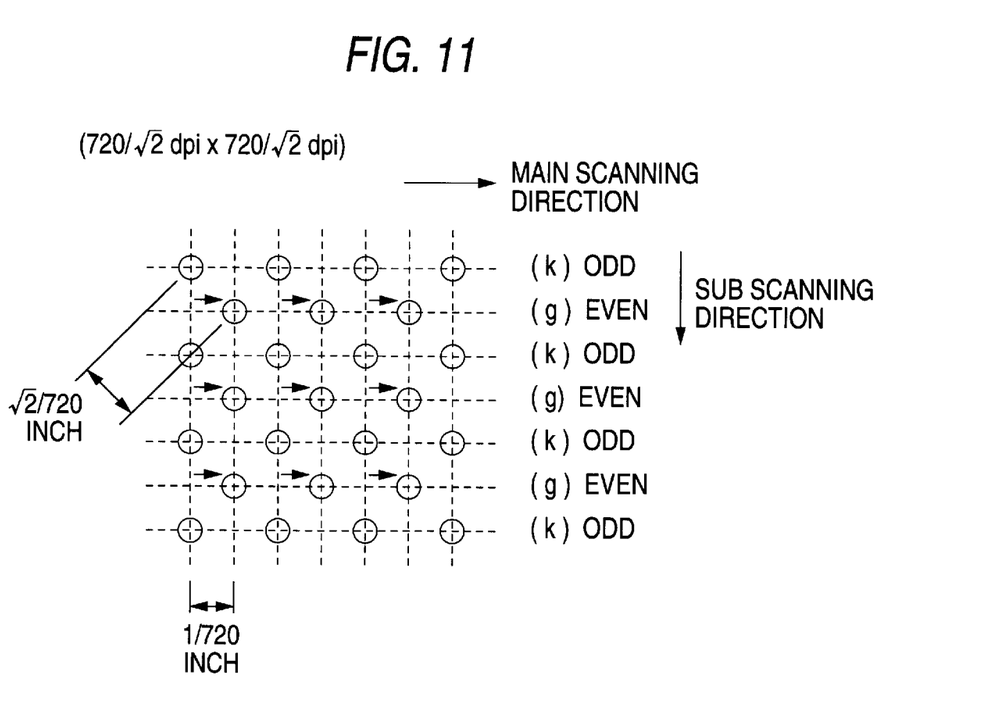
FIG. 11 illustrates intermediate-resolution image data obtained by varying the dot arrangement after the binarization process based on the error diffusion method has been conducted.

Each pixel data subjected to the binarization process is sent to the image data reconstitution unit 8. The image data reconstitution unit 8 shifts each of the dots on the even-numbered line (g) of image data of 360 dpi×720 dpi by 1/720 inch rightward in the main scanning direction, as shown in FIG. 11, so as to transform the bit image data subjected to the binarization process into image data having intermediate resolution of 720/√2 dpi×720/√2 dpi. Also, the image data are distributed as shown in FIG. 6 irrespective of whether weighing for error diffusion in the binarization process under the error diffusion method is added to the even or odd-numbered line.

Thus, binary gradated image data, whose resolution has been converted to the intermediate resolution (720/√2 dpi× 720√2 dpi), is sent to the data list matching unit 9. In step S6 of FIG. 7, the data list matching unit 9 rearranges the dot data in the image data, as shown in FIG. 11, in such a manner as to correspond the operating characteristics of the binary image output unit 3. When an interlace type printer is used as the binary image output unit 3, for example, lines for simultaneously printing are chosen out of the image data of FIG. 11 before being rearranged. When two-way printing is carried out, however, the dot data of the image data of FIG. 11 are further rearranged along the scanning direction of a printing head.

Finally, in step S7, the binary gradated image data D2 having the intermediate resolution (720/√2 dpi×720/√2 dpi), and with the dot data thus rearranged, is sent to the binary image output unit 3 (as shown in FIG. 1), so that the data is reproduced as a printed image, a picture or the like.

With reference to the image data of 720/√2 dpi resolution, as shown in FIG. 8(b), and that shown in FIG. 9(c), for example, the image data of 360 dpi×720 dpi for error diffusion has been prepared as shown in FIG. 10 by shifting each dot on the even-numbered line (g) leftward in the main scanning direction. However, image data having a resolution of 720 dpi×360 dpi for error diffusion may be prepared by shifting each dot on the even-numbered line (g) upward in the sub-scanning direction instead. In this case, however, a memory for error diffusion processing needs a memory capacity of 720 dpi.

Additionally, according to the embodiment of the invention shown in FIG. 3, the weighted matrix for error diffusion has been switched between the odd and even-numbered lines in order to apply the binarization process based on the error diffusion method or the like to the image data of 720/√2 dpi shown in FIG. 8(b) and FIG. 9(c). That is, the image data dots are arranged so that the dots on the odd-numbered lines and those on the even-numbered lines are alternately positioned. When the error data computed in the error computation/diffusion unit 13 is stored in the diffusion error storage unit 16, however, the error data itself may be shifted in the storage area in place of switching the weighted matrix.

Figure 12:
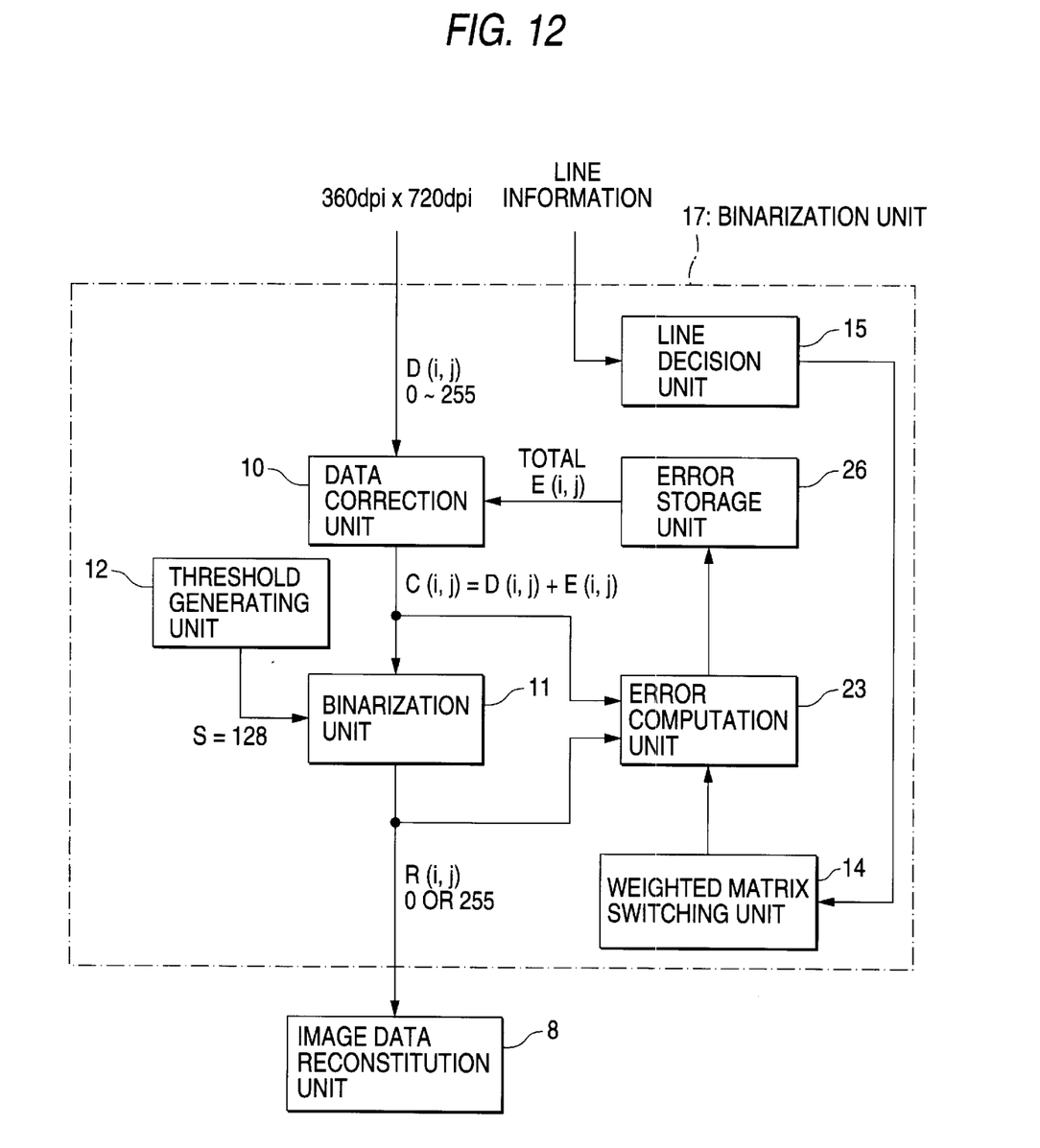
FIG. 12 illustrates an embodiment of a binarization processing unit according to the present invention which performs binarization based on an average error minimization method.

FIG. 12 illustrates a binarization unit 17, which is an alternate embodiment of the binarization unit 7. Binarization unit 17 performs binarization using the average error minimization method. In particular, binarization unit 17 includes an error computation unit 23 in place of the error computation/diffusion unit 13 present in binarization unit 7, and further, an error storage unit 26 in place of the diffusion error storage unit 16 of binarization unit 7. The other elements are similar to those present in binarization unit 7, as shown FIG. 3.

The error computation unit 23 computes the binarization error E(i, j) of the selected pixel as follows:

$$E(i, j) = C(i, j) - R(i, j).$$

The error computation unit 23 then writes the resulting value to an address corresponding to the selected pixel of the error storage unit 26. Consequently, binarization errors of the binarized pixels are successively written to storage areas corresponding to the respective pixel addresses of the error storage unit 26.

When the multi-gradated image data D(i, j) of the selected pixel P(i, j) is fed to the data correction unit 10, the data correction unit 10 reads an error of the binarized pixel close to the selected pixel P(i, j) from the error storage unit 26. Then, the data correction unit 10 gives a predetermined weight to the error data read according to the weighted matrix designated by the weighted matrix switching unit 14 to obtain an average error, and adds the average error to the multi-gradated image data D(i, j) of the selected pixel to provide corrected image data C(i, j) to the binarization unit 11.

Figure 13:
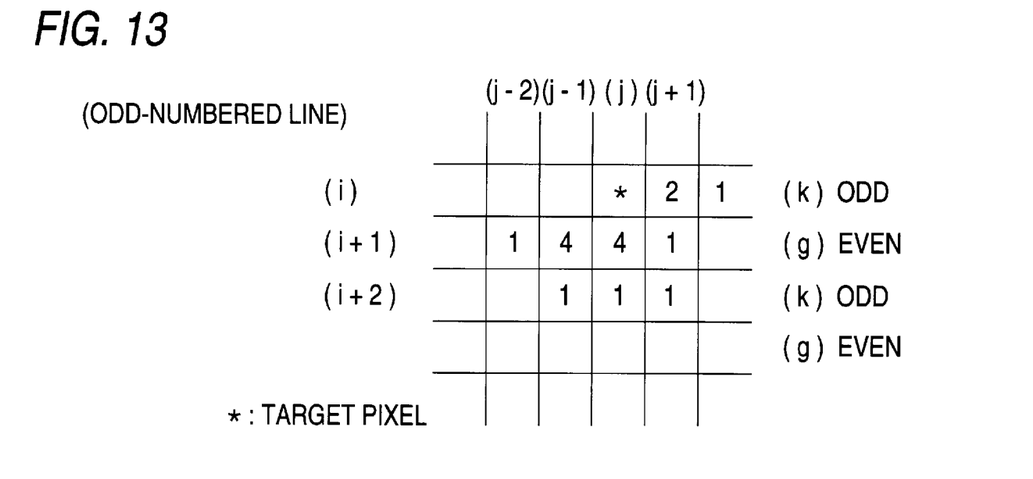
FIG. 13 shows another example of a weighted matrix to be switched over when the binarization process based on the error diffusion method is conducted according to the present invention.
Figure 14:
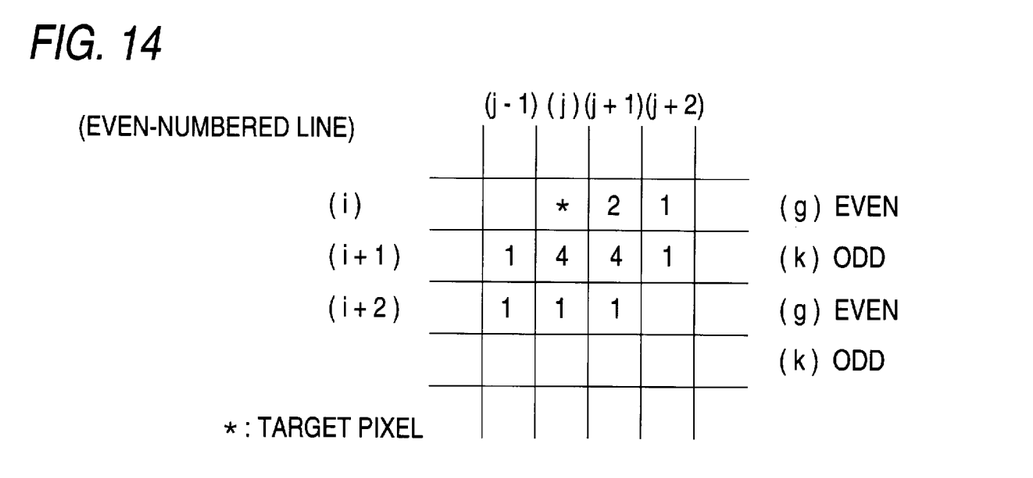
FIG. 14 illustrates another example of a weighted matrix to be switched over when the binarization process based on the error diffusion method is conducted according to the present invention.
Figure 15:
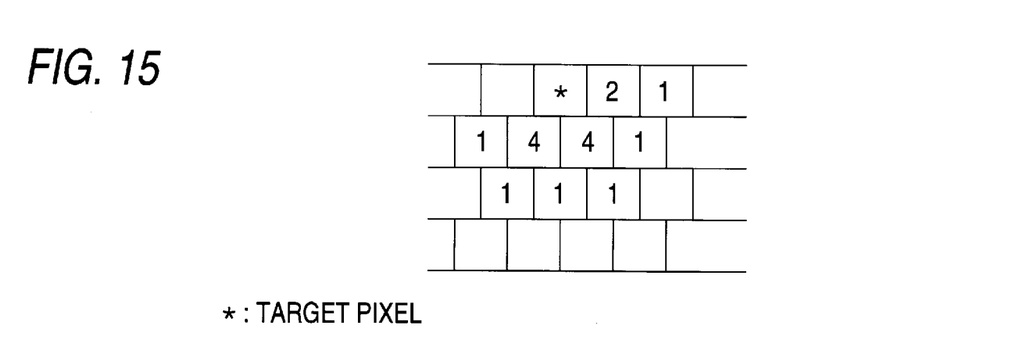
FIG. 15 shows a further example of a weighted matrix to be switched over when the binarization process based on the error diffusion method is conducted according to the present invention.

FIG. 15 illustrates an alternative embodiment of a weighing form for error diffusion with respect to the image data with resolution of 720/√2 dpi×720/√2 dpi, as shown in FIG. 11. The binarization process can be conducted in a weighing form as shown in FIG. 15 according to the error diffusion method. Moreover, the weighted matrix shown in FIG. 13 is switched to what is shown in FIG. 14 in between cases where the watched pixel belongs to the odd-numbered line (k) and when it belongs to the even-numbered line (g), so as to materialize the weighing form.

Although only a few exemplary embodiments of this invention have been described in detail above, those skilled in the art will readily appreciate that many modifications are possible in the exemplary embodiments without materially departing from the novel teachings and advantages of this invention. Accordingly, all such modifications are intended to be included within the scope of this invention as defined in the following claims.

What is claimed is:

1. An image processing method for varying the resolution of multi-gradated image data to output image data having a different resolution, the multi-gradated image data defining dots, the method comprising the steps of:

converting the resolution of the multi-gradated image data to a predetermined resolution thereby defining resolution-converted image data;

defining all of the dots of the resolution-converted image data as a set of alternating pixels with all of the pixels being in an arrangement of lines and rows, the lines including even and odd numbered lines, each of the pixels being in a respective one of the lines, the pixels present in the odd-numbered lines and the pixels present in the even-numbered lines having respectively alternate rows, one of the pixels in each of the even-numbered lines having part of an edge in common with parts of edges of two of the pixels in an adjacent one of the odd-numbered lines, the two of the pixels being in the same adjacent odd-numbered line;

transforming the resolution-converted image data into binarization data based on the defined set of alternating pixels;

converting said binarization data into binary gradated image data; and transforming the dot arrangement of the binary gradated image data into a dot arrangement equal to that of the arrangement of the set of alternating pixels.

2. An image processing system for varying the resolution of multi-gradated image data to output image data having a different resolution, the multi-gradated image data defining dots, the system comprising:

a resolution converter which:

converts the resolution of the multi-gradated image data to a predetermined resolution thereby defining resolution-converted image data, and defines all of the dots of the resolution-converted image data as a set of alternating pixels with all of the pixels being in an arrangement of lines and rows, the lines including even and odd numbered lines, each of the pixels being in a respective one of the lines, the pixels present in the odd-numbered lines and the pixels present in the even-numbered lines having respectively alternate rows, one of the pixels in each of the even-numbered lines having part of an edge in common with parts of edges of two of the pixels in an adjacent one of the odd-numbered lines, the two of the pixels being in the same adjacent odd-numbered line;

a first transforming device which transforms the resolution-converted image data into binarization data based on the defined set of alternating pixels;

a binarization converter which converts said binarization data into binary gradated image data; and a second transforming device which transforms the dot arrangement of the binary gradated image data into a dot arrangement equal to that of the arrangement of the set of alternating pixels.

3. An image processing system as claimed in claim 2, wherein;

the predetermined resolution of the resolution converter is an intermediate resolution which is between a predetermined high resolution of the multi-gradated image data and a predetermined low resolution of the multi-gradated image data.

4. An image processing system as claimed in claim 3, wherein the predetermined low resolution is A dpi×A dpi, where A is a natural number, the predetermined high resolution is 2A dpi×2A dpi, and the intermediate resolution is A$\sqrt{2}$ dpi×A$\sqrt{2}$ dpi.

5. An image processing system as claimed in claim 2, wherein said first transforming device transforms the image data having alternating pixels to binarization data by shifting the pixels in the odd-numbered lines or the pixels in the even-numbered lines in a main scanning direction.

6. An image processing system as claimed in claim 2, wherein the resolution converter applies a selected one of a plurality of weighted matrices to a selected one of the pixels, the selected one of the plurality of weighted matrices being selected based on whether the selected one of the pixels has, as its respective line, one of the even numbered lines or one of the odd numbered lines.

7. An image processing system as claimed in claim 2, wherein the resolution converter copies the gradation value of each dot of the image data having a predetermined low resolution at a position of a predetermined adjoining dot to increase the resolution of the image data.

8. An image processing system as claimed in claim 2, wherein the resolution converter groups two adjoining pixels of the image data as one set, and shifts the one of said pixels having a lower gradation value than the other dot in each set to a location of the other dot to decrease the resolution of said multi-gradated image data.

9. An image processing system as claimed in claim 2, wherein said binarization converter converts said binarization data into binary gradated image data by using one of: an error diffusion method, and an average error minimization method.

10. A computer-readable medium encoded with a computer program for varying the resolution of multi-gradated image data to output image data having a different resolution, the multi-gradated image data defining dots, the computer program causing a computer to perform the steps of:

converting the resolution of the multi-gradated image data to a predetermined resolution thereby defining resolution-converted image data;

defining all of the dots of the resolution-converted image data as a set of alternating pixels with all of the pixels being in an arrangement of lines and rows, the lines including even and odd numbered lines, each of the pixels being in a respective one of the lines, the pixels present in the odd-numbered lines and the pixels present in the even-numbered lines having respectively alternate rows, one of the pixels in each of the even-numbered lines having part of an edge in common with parts of edges of two of the pixels in an adjacent one of the odd-numbered lines, the two of the pixels being in the same adjacent odd-numbered line;

transforming the resolution-converted image data into binarization data based on the defined set of alternating pixels;

converting said binarization data into binary gradated image data; and transforming the dot arrangement of the binary gradated image data into a dot arrangement equal to that of the arrangement of the set of alternating pixels.

11. A computer-readable medium as claimed in claim 10, wherein the predetermined resolution of the step of converting the resolution is an intermediate resolution which is between a predetermined high resolution of the multi-gradated image data and a predetermined low resolution of the multi-gradated image data.

12. A computer-readable medium as claimed in claim 11, wherein the predetermined low resolution is A dpi, where A is a natural number, the predetermined high resolution is 2A dpi×2A dpi, and the intermediate resolution is A$\sqrt{2}$ dpi×A$\sqrt{2}$ dpi.

* * * * *